Dec. 4, 1934.   R. C. SHERMUND   1,983,149
ELECTRIC MOTOR MECHANISM
Filed Nov. 21, 1932   2 Sheets-Sheet 1
FIG_1_
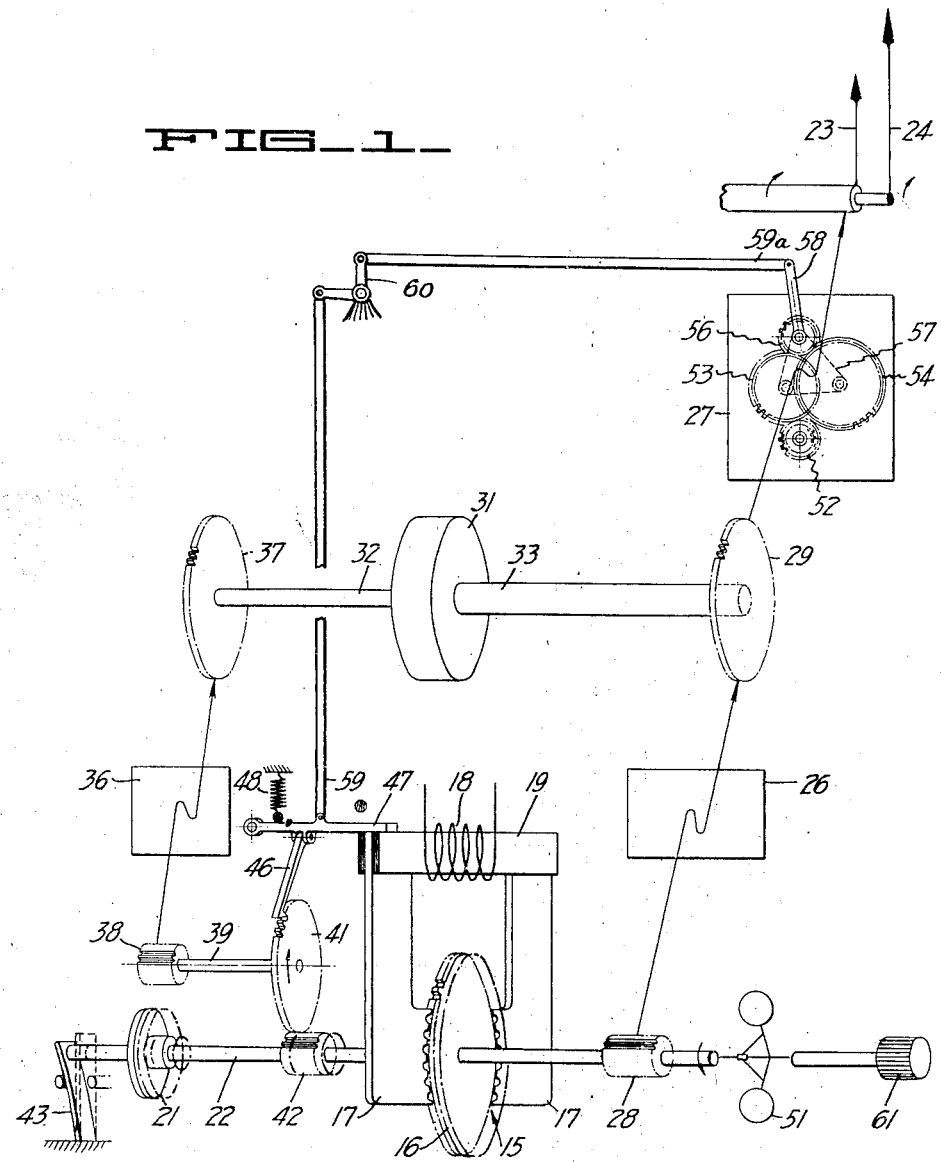
FIG_3_ FIG_4_
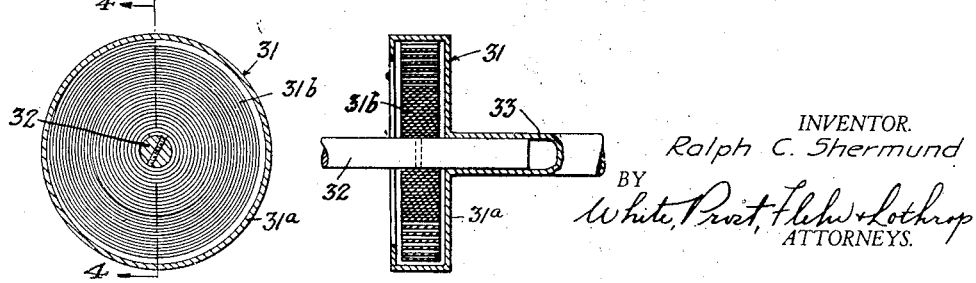
INVENTOR.
Ralph C. Shermund
BY
White, Prost, Fleur+Lothrop
ATTORNEYS.

Dec. 4, 1934.  R. C. SHERMUND  1,983,149
ELECTRIC MOTOR MECHANISM
Filed Nov. 21, 1932  2 Sheets-Sheet 2
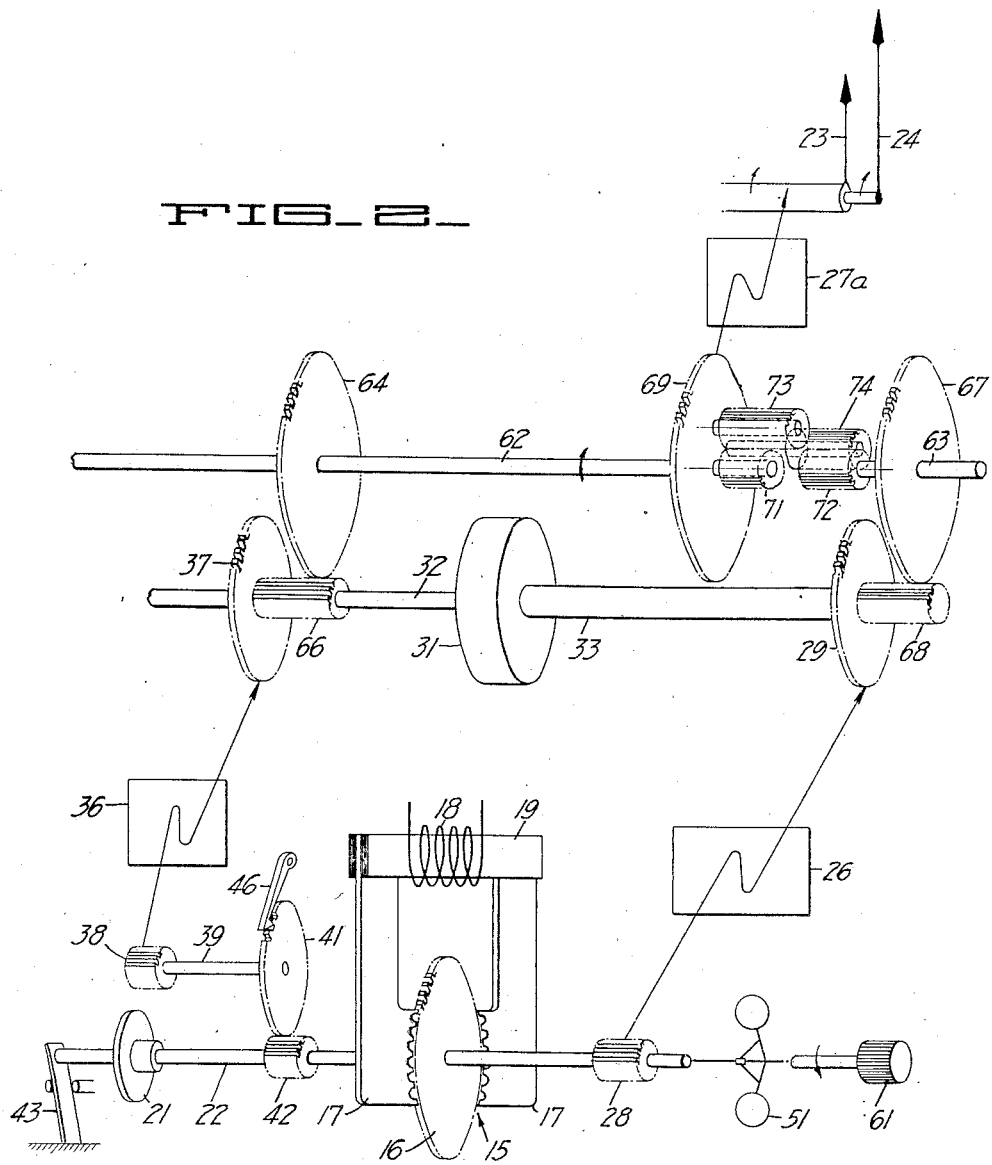
INVENTOR.
Ralph C. Shermund
BY
White, Prost, Flehr & Lothrop
ATTORNEYS.

Patented Dec. 4, 1934

1,983,149

UNITED STATES PATENT OFFICE 1,983,149

ELECTRIC MOTOR MECHANISM

Ralph C. Shermund, San Francisco, Calif., assignor to Stanford Products, San Francisco, Calif., a corporation of California Application November 21, 1932, Serial No. 643,575

3 Claims. (Cl. 58—26)

This invention relates generally to motive mechanisms for operation upon alternating current supply lines of controlled frequency. Such mechanisms are useful in the construction of secondary electrical clocks, or for other purposes where it is desired to drive one or more members at a predetermined rate.

In the construction of motive mechanism for use in electrical clocks, it has been common to utilize an auxiliary spring motor in conjunction with a synchronous electrical motor for driving the hands or time elements of the clock upon failure of the current supply. It has also been proposed to utilize the synchronous electric motor for winding the spring motor. One difficulty with such prior mechanisms is that they have required the use of shaded synchronous motors, which are relatively expensive to manufacture, and which are not as accurate as non-self-starting synchronous motors. Furthermore if a mechanism such as disclosed in Brower application Ser. No. 597,003 is employed, in which the spring motor drives the rotor of the electric motor during periods of current failure, and in which the rotor of the electric motor is normally operated at a subsynchronous speed, it is difficult to provide a proper governor so that the time elements will be driven at the proper rate at all times.

It is a general object of the invention to provide a motive mechanism suitable for secondary electrical clocks, which will afford a high degree of accuracy, and which will be relatively cheap to manufacture.

It is a further object of the present invention to provide a motive mechanism of the above character, which will make use of a pure synchronous motor of the type which is normally non-self-starting. In connection with this object the invention is characterized by the fact that during periods of current failure, the spring motor drives the rotor of the synchronous motor at a supersynchronous speed without changing the speed of movement of the time elements, and when the current supply to the synchronous motor is again established, the rotor is permitted to coast down to synchronous speed.

Further objects of the invention will appear from the following description in which the preferred embodiments of the invention have been set forth in detail in conjunction with the accompanying drawings.

Referring to the drawings:

Figure 1 is a diagrammatic view, illustrating one embodiment of the present invention.

Fig. 2 is a diagrammatic view illustrating a second embodiment of the present invention.

Fig. 3 is a transverse cross-sectional detail showing a suitable form of spring motor for use in conjunction with the invention.

Fig. 4 is a cross-sectional detail taken along the line 4—4 of Fig. 3.

Referring first to Fig. 1 of the drawings, I have shown therein a synchronous electric motor 15 of the non-self-starting type. This motor includes a magnetic rotor 16 of the dentate type, arranged to operate in a magnetic field formed apart by the dentate pole pieces 17. The field coil 18 is adapted to be connected to a suitable source of alternating current of controlled frequency, as for example the 60 cycle current distribution lines such as are now available in this country. The magnetic core 19 for coil 18, is magnetically coupled to the pole pieces 17. In order to maintain the rotor 16 in synchronism and to enable it to fall into synchronism when it is permitted to coast down from a super-synchronous speed, I can employ any one of a number of suitable mechanical dampeners. For example I have shown a fly wheel 21 journaled to the rotor shaft 22. The friction afforded between fly wheel 21 and shaft 22 provides forces of sufficient magnitude, to maintain the rotor in proper synchronism, and to cause the rotor to fall into step when it is permitted to coast down from a super-synchronous speed.

The time elements to be driven by my mechanism have been represented by the hour and minute hands 23 and 24, of a clock. In order to operably connect the hands 23 and 24 with the shaft 22 of rotor 16, I have indicated the use of primary and secondary gear trains 26 and 27. The details of these gear trains will of course vary in practice, and therefore no specific construction will be described. It may be noted however that hands 23 and 24 are driven at their proper respective speeds, and that the first element of the primary train 26 may include the pinion 28, secured to the motor shaft 22. To indicate proper coordination of my mechanism with a spring motor, I have also shown the trains 26 and 27 connected by the intermediate gear 29.

The spring motor utilized with my mechanism has been indicated generally at 31, and is shown associated with the concentric shafts 32 and 33. This motor may consist of a spiral spring having its one end connected to shaft 32, and having its other end operably connected to shaft 33 thru a slip barrel or max-torque clutch. When shaft 32 is rotated in one direction with respect to shaft 33, the spring is tensioned, and when the tensioning of the spring reaches a predetermined value, the clutching means permits slippage and prevents further winding. A suitable type of spring motor, forming of itself no part of the present invention, is shown in Figs. 3 and 4. It consists of a casing 31a connected to the shaft 33, and housing a spiral spring 31b. The inner end of this spring is connected to shaft 32, while the outer convolution presses against the inner peripheral surface of the casing 31a to form a frictional engagement. When the spring has been wound to a predetermined degree, by continued turning of shaft 32 relative to shaft 33, slippage occurs between the outer convolution of spring 31b and the casing 31a, to prevent further tensioning. When shaft 32 is held stationary the spring can drive shaft 33 through the frictional engagement with casing 31a, until the spring is unwound.

In order to automatically wind the spring motor 31 by the electric motor 15, I have indicated a gear train 36 which serves to connect the motor shaft 22 with the spring motor shaft 32. This gear train may include a gear 37 mounted upon shaft 32, pinion 38 mounted upon a countershaft 39, gear 41 mounted upon countershaft 39, and a pinion 42 mounted upon the motor shaft 22, and engaging gear 41. Obviously equivalent motion transmitting elements may be substituted for the elements last mentioned.

In order to disconnect the gear train 36 during periods of failure of current supply to the electric motor 15, I provide a suitable magnetic clutch, or equivalent means. Thus shaft 22 may be made longitudinally slidable between predetermined limits, and can be biased in one direction by suitable means such as a leaf spring 43. When the electric motor is deenergized, leaf spring 43 slides shaft 22 a limited amount, to transpose rotor 16 laterally with respect to the pole pieces 17. In such position pinion 42 is disengaged with respect to gear 41. When the electric motor is energized however, rotor 16 is pulled back to the plane of pole pieces 17, to cause pinion 42 to again engage gear 41.

It may be explained at this point that the primary gear train 26 has a somewhat greater speed reducing ratio than the gear train 36. In other words when shaft 22 is being driven electrically, shafts 32 and 33 are driven at different speeds, thru the gears 29 and 37, to cause the spring motor 31 to be wound. However when the electric motor is deenergized, gear 41 is disconnected with respect to pinion 42, the shaft 32 is locked, and spring motor 31 affords sufficient torque to drive rotor 16 at a super-synchronous speed for a considerable period of say ¾ of an hour.

In order to lock shaft 32 during periods when the spring motor is driving the driving elements, I provide suitable ratcheting mechansm. Thus I have shown a pawl 46 engaging the teeth of gear 41. For a purpose to be presently explained, in place of having pawl 46 carried by a fixed support, I preferably connect the same to a movable magnetic armature 47. This armature is magnetically associated with the core 19 of the electric motor, and is biased toward open position by suitable means such as a spring 48.

It has been previously mentioned that during periods of current failure, spring motor 31 supplies sufficient torque to drive the rotor 16 at a super-synchronous speed, which may be several times normal synchronous speed. During such periods the speed of rotation of rotor 16 may be governed by suitable means such as a centrifugal governor 51, or by a conventional escapement associated with primary gear train 26 as indicated. If the driving ratio from shaft 33 to the timing elements were to remain constant, then the timing elements would be driven at a substantially greater speed during periods of current failure. In order to insure movement of the timing elements at constant speeds at all times, I provide suitable means for changing the drive ratio to the time elements during periods of current failure. As diagrammatically representative of such a changeable ratio drive connection, I have indicated the secondary gear train 27 as including the driven pinions 52, journaled to a fixed support. Pinions 53 and 54 serve to alternatively mesh with one of the pinions 52. Pinion 56 meshes with both pinions 53 and 54, and serves to drive the timing elements thru suitable connecting ports of the gear train. Gears 53 and 54 are journaled to a movable plate 57, which in turn is journaled concentric with the axis of pinion 56. For shifting plate 57, I have indicated a lever 58, which is connected to armature 47 thru links 59 and 59a and intervening lever 60, the particular connecting means illustrated forming of itself no part of the present invention. When armature 47 is held in the attracted position, the drive of gear train 27 is thru the larger one of the pinions 52, gear 53 and pinions 56. However when armature 47 is in released position, the drive is thru the smaller one of the pinions 52, gear 54 and pinion 56, thus causing the ratio to be increased so that the time elements 23 and 24 are continued in motion at the same speeds, although at such time rotor 16 is being driven by the spring motor at a super-synchronous speed. As is evident from the immediately preceding description, the drive from the spring and electric motors is to the pinions 52 of gear shift unit 27, while the drive to the time elements is from element 56 of unit 27.

Operation of the mechanism illustrated in Fig. 1 is as follows: Upon connecting coil 18 of the electric motor to a suitable source of alternating current, rotor 16 is launched to a speed above synchronism, and is then permitted to coast down into synchronism. This initial starting of the synchronous motor may be accomplished by whirling knob 61 secured to the motor shaft 22. The synchronous motor now drives the time elements 23 and 24 at the desired speed, thru the drive connection formed by primary and secondary gear trains 26 and 27. At the same time, since gear 41 is in mesh with pinion 42, the electric motor is winding the spring motor 31 thru the gear train 36. While the electric motor is so functioning, armature 47 is in its attracted position, to secure a proper gear ratio to the timing elements. After the spring motor has been completely wound, slippage occurs by virtue of the slip barrel or max-torque clutch associated with the spring motor. Upon failure of the current supply to the electric motor, rotor 16 is shifted longitudinally by virtue of spring 43, to disengage gear 41 with respect to gear 42. Gear 41 is locked against rotation in a reverse direction by virtue of pawl 46. Release of armature 47 serves to change the gear ratio of the drives to the time elements. At the same time the spring motor immediately takes up the drive, and accelerates the rotor 16 to a super-synchronous speed. This super-synchronous speed is of course governed, so that with the drive ratio now afforded to the timing elements, the timing elements are continued in movement at the same speeds at which they were driven when the electric motor was supplied with electric current and operated at true synchronous speed. When the current supplied to the electric motor is again established, rotor 16 is shifted longitudinally to enage gear 41 with pinion 42, and since it is then placed in winding relationship with the spring motor, it immediately coasts down and falls into step with the current alternations. At the same time closing the armature 47 changes the gear ratio to the timing elements, so that these elements are again driven by the electric motor.

It is characteristic of my mechanism that when the electrical current supply is again reestablished, the rotor of the electric motor is at super-synchronous speed so that it may immediately coast down and fall into step. In other words at no time is the rotor permitted to operate at a sub-synchronous speed, since such operation would involve immediate stoppage of the motor upon reestablishing the electrical current. In the event the current failure is of such short duration that pinion 42 is not afforded an opportunity to disengage with respect to gear 41, then the momentary movement of armature 47 between closed and open positions imparts a rotary torque to gear 41, thus tending to prevent the speed of rotation of rotor 16 from falling below synchronism. In this connection note that in the event pawl 46 is connected to armature 47, spring 48 should be sufficient to supply a proper rotary torque to gear 41, against the imposing torque exerted by the spring of motor 31.

Because of the use of a simple type of true synchronous motor, as distinguished from an induction motor or one having a shaded armature or shaded windings, my mechanism is characterized by high degree of accuracy during periods when the current supply is established. Likewise the use of a simple type of true synchronous motor materially reduces the cost of manufacture. A further desirable feature of my invention is that the driving of the rotor of the electric motor at a super-synchronous speed not only permits the rotor to fall into step when the current supply is reestablished, but also facilitates governing the mechanism to secure accuracy when the mechanism is being driven from the spring motor.

In Fig. 2 I have represented a modification of the invention which utilizes planetary gearing between the spring motor and the timing elements, thus obviating the use of a movable member for changing the gear ratio. In this case the secondary gearing 27a, includes the counter shafts 62 and 63. Countershaft 62 is operably connected to the spring motor shaft 32, thru gear 64 and pinion 66. Shaft 63 is operably connected to the shaft 33 of the spring motor thru gear 67 and pinion 68. Journaled to shaft 62, there is gear 69 from which the drive is taken to the time elements 23 and 24. Fixed to shaft 62 and 63, are pinions 71 and 72 respectively, which are concentric. Meshing with pinion 71, there is a pinion 73 which also meshes with a portion of a pinion 74. Pinion 74 also meshes with pinion 72. Both the pinions 73 and 74 are secured by suitable journal means, to the gear 69.

Operation of the modification illustrated in Fig. 2 can be briefly explained as follows:—During periods of current failure to the electric motor, it has been previously mentioned that shaft 62 is locked by suitable means, such as pawl 46. Therefore pinion 71 of the planetary gear arrangement becomes locked in stationary position, and the drive from the spring motor to the timing elements occurs from pinion 68, thru gear 67, pinion 72, pinion 74, pinion 73, gear 69, and thence to the time elements. At this time pinion 73 gyrates about pinion 71, and carries with it gear 69. When the current supply to the electric motor is established and its rotor is being driven magnetically at a relatively lower synchronous speed, pinion 71 is driven in the same direction of rotation as pinion 72, and although pinion 72 is now being driven at a reduced rate, the resulting speed of rotation of gear 69 is substantially the same. With this arrangement there is therefore afforded a changeable ratio gearing, the ratio which is changed automatically in accordance with rotation or the stoppage of a shaft or equivalent member, which in turn is operably connected to a member which serves to wind the spring motor. Likewise in this modification it will be noted that I have dispensed entirely with the magnetic armature 47, and that the pawl 46 has been carried by fixed supports.

I claim:

1. In mechanism of the character described, a movable time element, a non-self-starting synchronous electric motor, a spring motor, and means for causing the time element to be driven at a predetermined speed by the electric motor when the electric motor is energized, and for causing the spring element to drive the time element at the same speed when the electric motor is deenergized, said means including a drive connection serving to cause the spring motor to drive the rotor of the electric motor at a super-synchronous speed when the electric motor is deenergized.

2. In mechanism of the character described, a movable time element, a non-self-starting synchronous electric motor, a spring motor, and means for causing the time element to be driven at a predetermined speed by the electric motor when the electrical motor is energized and for causing the time element to be driven at the same speed by the spring motor when the electric motor is deenergized, said last means including a drive connection serving to cause the spring motor to drive the rotor of the electric motor at a supersynchronous speed when the electrical motor is deenergized, and means for causing the electric motor to wind the spring motor.

3. In mechanism of the character described, a movable time element, a non-self-starting synchronous electric motor, a spring motor, means for causing the time element to be driven by the electric motor when the electrical motor is energized and by the spring motor when the electrical motor is deenergized, said means including a driving connection serving to cause the spring motor to drive the rotor of the electric motor at a supersynchronous speed when the electric motor is deenergized and also having means for automatically increasing the driving ratio when the time element is being driven from the spring motor, and means for causing the synchronous motor to wind up the spring motor.

RALPH C. SHERMUND.